(12) United States Patent
Njilla et al.

(10) Patent No.: US 11,647,041 B2
(45) Date of Patent: May 9, 2023

(54) SYSTEM AND METHOD FOR PRIVACY PRESERVATION IN CYBER THREAT

(71) Applicant: GOVERNMENT OF THE UNITED STATES AS REPRESENTED BY THE SECRETARY OF THE AIR FORCE, Rome, NY (US)

(72) Inventors: Laurent Y Njilla, Liverpool, NY (US); Celestin Wafo Soh, Ridgeland, MS (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 769 days.

(21) Appl. No.: 16/575,790

(22) Filed: Sep. 19, 2019

(65) Prior Publication Data

US 2020/0322373 A1   Oct. 8, 2020

Related U.S. Application Data

(60) Provisional application No. 62/830,715, filed on Apr. 8, 2019.

(51) Int. Cl.
| | |
|---|---|
| *H04L 9/40* | (2022.01) |
| *G06F 21/62* | (2013.01) |
| *G06F 16/22* | (2019.01) |
| *G06F 16/27* | (2019.01) |
| *G06F 16/20* | (2019.01) |
| *G06N 5/01* | (2023.01) |

(52) U.S. Cl.
CPC ......... *H04L 63/1441* (2013.01); *G06F 16/20* (2019.01); *G06F 16/2282* (2019.01); *G06F 16/278* (2019.01); *G06F 21/6254* (2013.01); *G06N 5/01* (2023.01); *H04L 63/0428* (2013.01)

(58) Field of Classification Search
None
See application file for complete search history.

(56) References Cited

U.S. PATENT DOCUMENTS

| 9,313,177 B2 | 4/2016 | Blumenfeld et al. |
| 9,787,719 B2 | 10/2017 | Efstathopoulos |

(Continued)

FOREIGN PATENT DOCUMENTS

| CN | 108363928 A | * | 8/2018 | ......... G06F 21/6245 |

OTHER PUBLICATIONS

Marks, Joseph, https://www.nextgov.com/cybersecurity/2018/06/only-6-non-federal-groups-share-cyber-threat-info-homeland-security/149343/.

(Continued)

*Primary Examiner* — Michael Pyzocha
(74) *Attorney, Agent, or Firm* — AFRL/RIJ; Randall P. Jones

(57) ABSTRACT

A system and method enabling enterprises to engage in cyber threat information sharing in a privacy-enhanced fashion. The invention reduces the enterprise's risk to sensitive information leakage by inducing a state in the information it shares such that, when an enterprise's shared data attributes are interdependent, the sensitive features (those to be kept private to the enterprise) are not deducible by another enterprise. This state is accomplished by employing rough set theory to undermine the deductive route to the data's sensitive features.

12 Claims, 4 Drawing Sheets

(56) References Cited

U.S. PATENT DOCUMENTS

| | | | | |
|---|---|---|---|---|
| 2016/0065610 | A1* | 3/2016 | Peteroy | H04L 63/1441 |
| | | | | 713/153 |
| 2016/0292455 | A1* | 10/2016 | Jebara | G06F 21/6254 |
| 2017/0134425 | A1* | 5/2017 | Albertson | G06F 21/50 |
| 2017/0187742 | A1* | 6/2017 | Rogers | H04L 63/1433 |
| 2017/0228658 | A1* | 8/2017 | Lim | G06F 21/56 |
| 2019/0306127 | A1* | 10/2019 | Efremov | H04L 67/10 |
| 2020/0145382 | A1* | 5/2020 | Shmueli | B61L 23/04 |
| 2020/0314215 | A1* | 10/2020 | Lapushkin | H04L 67/01 |
| 2020/0327252 | A1* | 10/2020 | McFall | G06F 21/78 |

OTHER PUBLICATIONS

Office of the Director of National Intelligence, Ref Book—Cybersecurity Act of 2015, https://www.dni.gov/index.php/ic-legal-reference-book/cybersecurity-act-of-2015.

Johnson, Chris, Badger, Lee Badger, Waltermire, David, Snyder, Julie, Skorupka, Clem, NIST Special Publication 800-150 Guide to Cyber Threat Information Sharing, https://nvlpubs.nist.gov/nistpubs/SpecialPublications/NIST. SP.800-150.pdf.

Fortinet-IBM Security Alliance, https://www.fortinet.com/partners/partnerships/alliance-gpartners/alliances/ibm-security.html.

Knake, Robert, "Sharing Classified Cyber Threat Information With the Private Sector", https://www.cfr.org/report/sharing-classified-cyber-threat-information-private-sector.

Arizona Cyber Warfare Range, https://www.azcwr.org/.

Pawlak, Zdzislaw, "Rough sets", International Journal of Parallel Programming, vol. 11, No. 5, pp. 341-356, 1982.

Suraj, Zbigniew, "An Introduction to Rough Set Theory and Its Applications a tutorial", Proceedings of the 1st International Computer Engineering Conference: New Technologies for the Information Society (ICENCO 2004), Cairo, Egypt.

* cited by examiner

SYSTEM AND METHOD FOR PRIVACY PRESERVATION IN CYBER THREAT

RELATED APPLICATIONS

This application claims all rights and priority on prior U.S. provisional patent application Ser. No. 62/830,715 filed Apr. 8, 2019, the entirety of the disclosure of which is incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the creation of a system and method for addressing the privacy of information in the context of cyber threat information sharing.

Cyber threat information is any data that can enable an enterprise to transform how it monitors, detects, shares, reacts, or remediates cyber threats. Examples of cyber threat information include indicators (system artifacts or observables associated with an attack), tactics, techniques, and procedures. Cyber threat information can take the following forms: security alerts (also known as bulletins), vulnerability notes, threat intelligence reports, and tool configurations. Enterprises that share cyber threat information can improve their own security postures as well as those of other organizations. By exchanging cyber threat information, enterprises can leverage the collective computer and network security knowledge and experience to gain a more complete understanding of the threats that the enterprise may face. Based on this knowledge, an enterprise can make more improved threat-informed decisions regarding defensive capabilities, threat detection techniques, and mitigation strategies. By analyzing cyber threat information from multiple sources, an enterprise can also modify existing information to improve the overall quality of the threat information through a reduction of ambiguity, inconsistencies, and errors. Additionally, sharing of cyber threat information allows enterprises to better detect campaigns that target industry sectors, business entities, governmental organizations, or institutions.

Cyber threat information sharing, or cyber threat intelligence, is a relatively new initiative that began to have serious attention starting around 2011 under the Obama administration. One of the first bills introduced to Congress concerning this sector, the Cyber Intelligence Sharing and Protection Act (CISPA), was meant to start the initiative of sharing technical information between the government and private sector organizations. It had gone through Congress multiple times with revisions leading into a more agreeable bill known as the Cybersecurity Information Sharing Act (CISA) [1]. This bill was ratified during October 2015, primarily backed by senators Dianne Feinstein (D-CA) and Richard Burr (R-NC). Within these newly written bills, there are specific sections and guidelines dealing with cyber threat information sharing between government and businesses. These bills were not only put into place to provide those guidelines, but also to help convince these institutions to voluntarily cooperate and increase the overall defensive posture. This has been met with both support and opposition.

The main idea of these laws is to create opportunities between government and private sector businesses, accomplished via a trickle-down effect that starts with government. The government disseminates the information down as publicly available knowledge, and in return private institutions are encouraged to send useful information back up the chain. Under CISA, the Director of National Intelligence, the Secretary of Homeland Security, the Secretary of Defense, and the Attorney General, in consultation with the heads of the appropriate federal entities, shall jointly develop and issue procedures to facilitate and promote a list of relevant sharing techniques [2]. The National Institute of Standards and Technology (NIST) has also made publicly available publication 800-150 in order to promote better guidelines to produce cyber threat information sharing materials [3]. In business-to-business scenarios, some agreements have been officially formed, such as with IBM and Fortinet [4].

The need to cover cyber threat information sharing extends beyond the government and private sector, most notably with critical infrastructure systems. There have been ongoing issues with what information should be shared with businesses operating critical infrastructure, as some of them are owned by foreign investors [5]. This has hindered information sharing where security clearances are involved. A possible answer to this would be to create a new classified network under DHS. The DOD uses a similar network called DIBNET-S and this would provide a way for non-federal entities to share cyber threat information more safely and easily between each other [5].

With government and private sector information sharing, there has been mixed reception to these initiatives. Many private institutions are not sharing much, if at all [1]. This is likely attributable to fear of exposing trade secrets and technical properties contained in intellectual property. Accordingly, support has mainly come from federal entities, educational institutions, and non-profits. One such company is the Arizona Cyber Warfare Range, who provides a free method of combating and testing cyber related incidents on real time virtualized networks for sandboxed testing [6].

As cyber threats become more advanced, the need to know about them becomes compelling. As such, with the proper incentives, cyber threat information sharing should in theory continue to grow organically. However, as indicated previously, there is a reluctance among participants who stand the benefit the most. This reluctance stems from the potential and inadvertent leaking of private information when the cyber threat information is shared. Until there are adequate assurances that participation in cyber threat information sharing will not expose an enterprise's private information, this risk will remain as a major hindrance to otherwise willing participants. CISPA and CISA are presently very new and have yet to mature; nonetheless, they establish the underlying idea of cyber threat sharing as a viable way to fully realize the value of the collective computer and network security knowledge and experience of enterprises. Nevertheless, these Acts alone are insufficient; instead, cybersecurity endeavors must move from static requirements and compliance to agile risk management. Removing the risks associated with cyber threat information sharing will increase the number of sharing participants. This, in turn, increases the breadth and depth of the information shared, thereby increasing the overall security posture of all participating enterprises.

Another major hurdle in adoption of cyber threat information sharing is the inability of an enterprise to readily distinguish which of its information must be kept private. An enterprise's inability to make this distinction is a result of imperfect knowledge of their information's distinguishing features. Data is foundational to information. When data is imbued with relevance it becomes information. Then, hierarchically, follows knowledge which is the ability to derive new information from existing information. Data is therefore the foundation upon which information, and then knowledge, are built. Imperfect knowledge is traceable to not understanding the relevance of the underlying data information's distinguishing features. Non-participation in cyber information sharing is attributable to an enterprise's inability to resolve its imperfect knowledge of how the data it might share could reveal private information that is translatable to outsiders' knowledge. This can be especially difficult due to hidden inferential paths from cyber threat information intended to be shared with other entities to private information the enterprise does not plan to share. An enterprise's inability to make this distinction is a result of imperfect knowledge of their information's distinguishing features. Non-participation in cyber information sharing is attributable to an enterprise's inability to resolve this imperfect knowledge. However, the present invention, utilizing mathematical and analytical techniques, bridges the gap that is created by imperfect information and reduces the possibility of an enterprise accidently sharing private information while participating in cyber threat information sharing with other enterprises.

Rough set theory, developed by Polish computer scientist Zdzislaw Pawlak, is a new mathematical approach to handling imperfect knowledge [7]. Since its introduction, rough set theory has become an important tool for computer scientists because among its advantages are its ability to: 1) not need any preliminary or additional details about data—like probability and statistics 2) provide efficient methods, algorithms, and tools for finding hidden patterns in data 3) allow for the reduction of the original dataset, so as to find minimal sets of data with the same knowledge as in the original data 4) allow the evaluation of the significance of data [8]. These advantages allow for an enterprise to effectively deal with the imperfect knowledge it has of its information and manage the risks associated with this imperfection such that joining in cyber threat information sharing becomes less inhibited.

There have also been several patented methods for preserving, to some degree, privacy in the context of cyber threat information sharing [U.S. Pat. No. 9,313,177] [U.S. Pat. No. 9,787,719]. U.S. Pat. No. 9,313,177 asserts anonymity for the participants in cyber threat information sharing. U.S. Pat. No. 9,787,719 establishes a trusted third-party broker to act as an intermediary between the sharers of cyber threat information where the third-party broker collects the information and privately shares it among the participating enterprises. While these patents are positive contributions to the goal of privately sharing cyber threat information, they are not comprehensive solutions. Whereas anonymity of participants keeps the identities of those participants private, their anonymity does not restrain their shared information from containing private information. A trusted third-party broker is likewise unable to discern if a participant's shared information inadvertently contains private information that should not be shared. Anonymity of participants would be greatly complemented by their ability to reduce the possibility of accidently sharing private information while participating in cyber threat information sharing with other enterprises. However, there exists no current cyber threat information sharing process that considers the advantages offered by rough set theory—especially the reduction of data in the formation of minimal sets such that the minimal sets contain the same knowledge as the original data.

REFERENCES

[1] Marks, Joseph, https://www.nextgov.com/cybersecurity/2018/06/only-6-non-federal-groups-share-cyber-threat-info-homeland-security/149343/
[2] Office of the Director of National Intelligence, *REF BOOK—CYBERSECURITY ACT OF* 2015, https://www.dni.gov/index.php/ic-legal-reference-book/cybersecurity-act-of-2015
[3] Johnson, Chris, Badger, Lee Badger, Waltermire, David, Snyder, Julie, Skorupka, Clem, *NIST Special Publication 800-150 Guide to Cyber Threat Information Sharing,* https://nvlpubs.nist.gov/nistpubs/SpecialPublications/NIST.SP.800-150.pdf
[4] Fortinet-IBM Security Alliance, https://www.fortinet.com/partners/partnerships/alliance-gpartners/alliances/ibm-security.html
[5] Knake, Robert, "Sharing Classified Cyber Threat Information With the Private Sector", https://www.cfr.org/report/sharing-classified-cyber-threat-information-private-sector
[6] Arizona Cyber Warfare Range, https://www.azcwr.org/
[7] Pawlak, Zdzislaw,"Rough sets", *International Journal of Parallel Programming*, Vol. 11, No. 5, pages 341-356, 1982.
[8] Suraj, Zbigniew, "An Introduction to Rough Set Theory and Its Applications A tutorial", *Proceedings of the 1st International Computer Engineering Conference: New Technologies for the Information Society (ICENCO 2004)*, Cairo, Egypt.

OBJECTS AND SUMMARY OF THE INVENTION

An object of the present invention is to ensure the privacy of databases by reducing the likelihood that sensitive data can be accesses maliciously.

Another object of the present invention is to eliminate or reduce the deductive paths to sensitive data in a database that can be exploited to access that sensitive data.

Briefly stated, the present invention provides a system and method enabling enterprises to engage in cyber threat information sharing in a privacy-enhanced fashion. The invention reduces the enterprise's risk to sensitive information leakage by inducing a state in the information it shares such that, when an enterprise's shared data attributes are interdependent, the sensitive features (those to be kept private to the enterprise) are not deducible by another enterprise. This state is accomplished by employing rough set theory to undermine the deductive route to the data's sensitive features.

In a preferred embodiment of the present invention, a system for ensuring privacy against cyber threats among a configuration of a plurality of computer network enterprises accessing a database processor over computer network communications channels, comprises a rough set sanitizer processor corresponding to one of the computer network enterprises; a first computer network communications channel between the computer network enterprise and the rough set sanitizer processor over which data is transmitted in tabular form; a second computer network communications channel between the rough set sanitizer processor and the database processor over which data that the rough set sanitizer has removed deductive paths to sensitive data from, is transmitted; and a third computer network communications channel between the database processor and the computer network enterprise over which database data having deductive paths to sensitive data removed, is transmitted in the same format as the initial input data.

DETAILED DESCRIPTION OF THE PREFERRED EMBODIMENT

Figure 1:
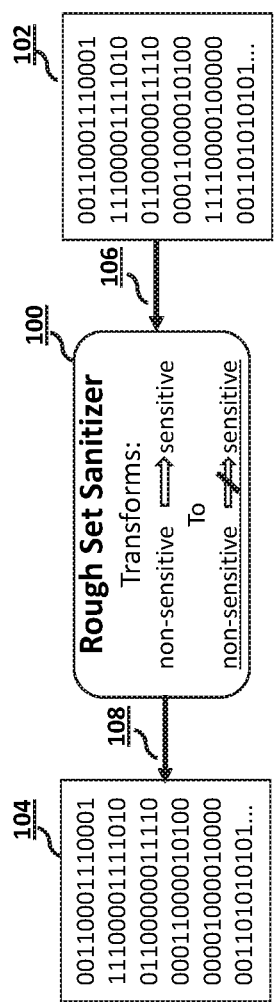
FIG. 1 depicts an embodiment acting to remove any inferential paths from non-sensitive information to sensitive information when cyber threat information is shared.

The features and advantages described in this summary and the following detailed description are not all-inclusive. Many additional features and advantages will be apparent to one of ordinary skill in the art in view of the drawings, specification, and claims hereof. While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

In the present invention, a system and method has been devised for enterprises to engage in cyber threat information sharing in a privacy-enhanced fashion. The invention reduces the enterprise's risk to sensitive information leakage by inducing a state in the information it shares such that, when an enterprise's shared data attributes are interdependent, the sensitive features (those to be kept private to the enterprise) are not deducible by another enterprise. This state is accomplished by employing rough set theory to undermine the deductive route to the data's sensitive features.

The invention uses rough set theory to balance the data's non-sensitive and sensitive attributes and then omit deduction from the former to the latter. With security becoming an increasingly more important concern among both public and private interests, enterprises representing both groups must begin to consider their participation in cyber threat information sharing. Since concerns over divulging private information is often the root cause of non-participation, the invention serves to provide a security method that lessens these concerns without diminishing the knowledge to be derived from the information shared. With a lessening of concerns over privacy, participation is heightened and with that comes the accompanying increase in the breadth and depth of information available to participants. Thus, the benefits of the invention are twofold: 1) it ushers in more widespread cyber threat information sharing so that the knowledge enterprises subsequently derive from this information serves to raise their security posture and 2) simultaneously lowers the risk to their privacy.

The present invention's system and method for addressing the privacy of information in the context of cyber threat information sharing and providing various advantages are discussed below. First, an embodiment will be shown describing appropriate environments for the application of a rough set sanitization system. Second, an embodiment will be presented that describes the construction of a rough set sanitization system that act to remove any inferential paths from non-sensitive information to sensitive information when cyber threat information that is to be shared. Third, a procedure will be shown for implementing and using rough set sanitization system in the context of the embodiment discussed in the first part.

Resolving the privacy conundrum does not boil down to redacting private information from shared documents. Indeed, assume that a privacy requirement is that we do not reveal the gender of a subject X and we comply by just redacting this attribute from shared document leaving the fact that the latter reveals that X was once pregnant. From this bit of information, an attacker would infer from his knowledge of biology that only females can be pregnant, hence X is a female. This is a simplified form of the linking attack. To plug such an inferential leak, the information owner was supposed to also suppress features that are peculiar to the gender of X. Note that the linking attack can also be developed through intermediate features within the shared document which leads to publicly available information that ultimately identifies the gender of X. The last form of attacks is the most difficult to defend. The publicly available features upon which sensitive attributes strongly depend are often referred to as quasi-identifiers (QIDs). They are the vectors of deductive breaches, and one of the most challenging problem of data sanitization is how to unravel these mediators of linking leaks.

Since QIDs are enablers of deductive breaches, there is a need for more procedures to infer them from the relationship between sensitive and non-sensitive features. Specifically, one must limit the flow of information from non-sensitive to sensitive attributes. Thus, the present invention treats the dependency where from sensitive data can be derived from non-sensitive data (i.e., "non-sensitive→sensitive").

In the present invention, rough set theory (RST) is the tool to analyze and resolve such dependency. In RST, there are numerical quantities that measure the degree of dependency of attributes. The present invention uses these measures to reduce the dependency between non-sensitive and sensitive attributes by promoting to QIDs those concepts of the first set that when removed, undermine this inferential relationship. Specifically, the present invention reorganizes the underlying raw data into decision tables in which the conditional concepts are the conflation of non-sensitive attributes and sensitive features with one left out, and the decision attribute is the omitted sensitive concept. In so doing, the present invention builds as many decision tables as there are sensitive concepts. The information systems thus constructed are in turn mined for quasi-identifiers using RST. The union of all the quasi-identifier sets is the sought QIDs of the raw information system. The granules induced by these QIDs are then merged in such a way that the diversity of sensitive attributes is increased in each of the resulting blocks. The present invention employs steps that harness the notion of rough closeness to strike a balance between the diversity of confidential attributes and the anonymity of QIDs.

Referring to FIG. 1, one type of embodiment is shown acting to remove any inferential paths from non-sensitive information to sensitive information when cyber threat information is to be shared. A Rough Set Sanitizer 100 accepts data 102 that comprises the cyber threat information that an enterprise intends to share. This data is communicated to the Rough Set Sanitizer across a channel 106 that the enterprise regards as secure in that it will not divulge private information contained in that data to any other entity than the Rough Set Sanitizer 100. The Rough Set Sanitizer 100 transforms the assumed non-sensitive data to assure that sensitive data cannot be derived from the assumed non-sensitive data. (i.e., the "non-sensitive→sensitive" deductive paths are removed). The transformed data 104 created by the Rough Set Sanitizer 100 is then ready for transmission across a channel 108 for contribution to cyber threat information sharing.

Figure 2:
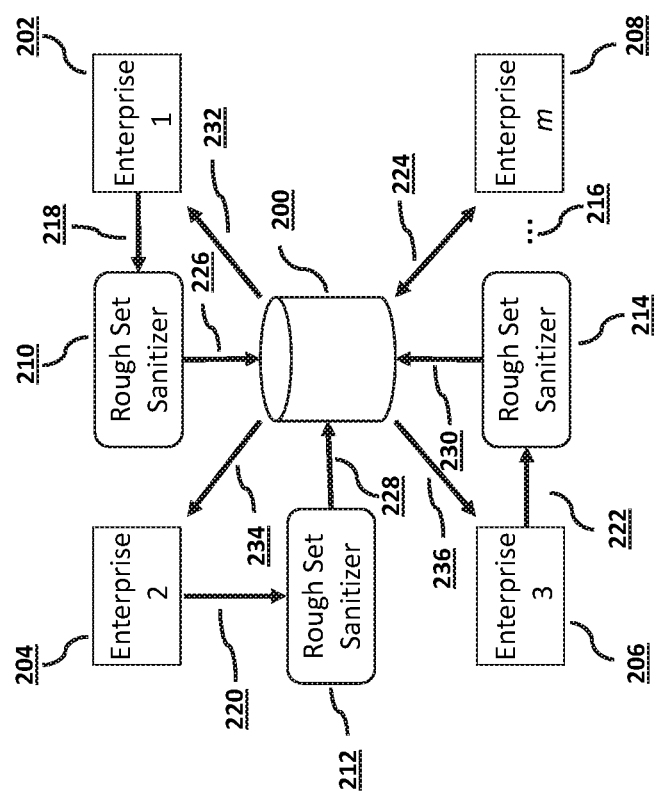
FIG. 2 depicts a cyber threat sharing environment according to an embodiment of the present invention.
Figure 3:
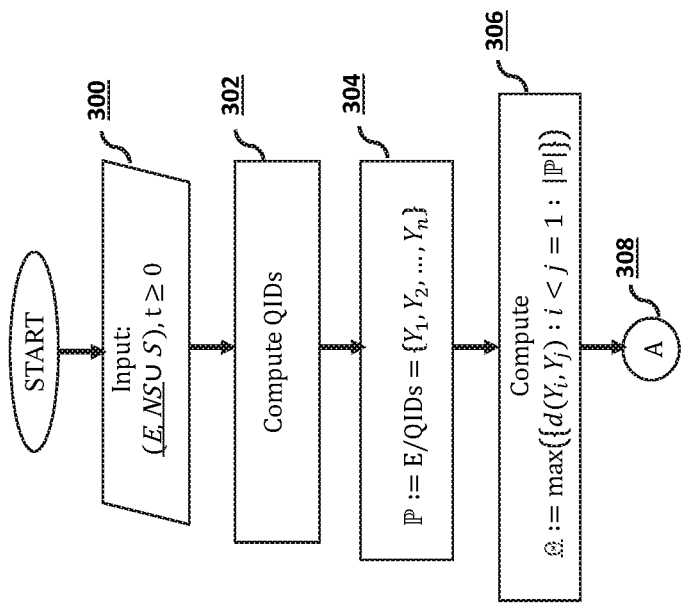
FIG. 3 is a flowchart illustrating how the rough set sanitization system operates for one embodiment. When cyber threat information that is to be shared, the system shown removes inferential paths from non-sensitive information to sensitive information.
Figure 4:
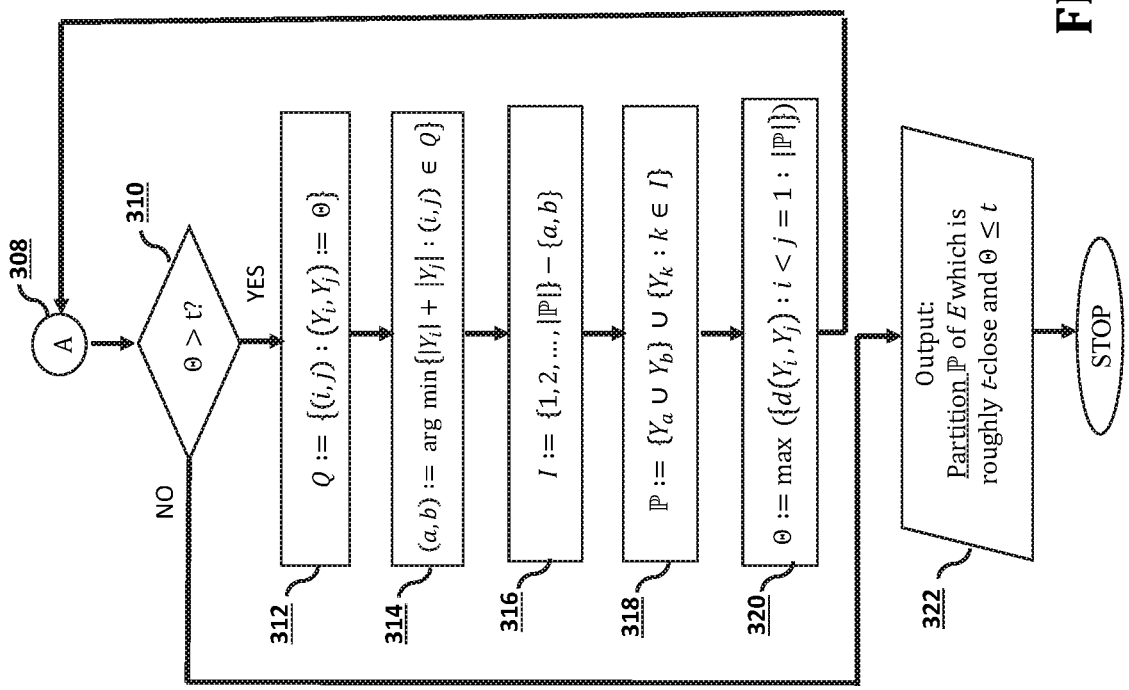
FIG. 4 is an extension of FIG. 3.

Referring to FIG. 2, the setup has m enterprises participating in cyber threat information sharing. The shared information is stored in a database 200. It is important to note that the symbol for the database 200 in FIG. 2 may be construed as a centralized database, or a distributed database for the purposes of fault tolerance or performance. In FIG. 2, Enterprise 1 202, Enterprise 2 204, Enterprise 3 206, and Enterprise m 208 are engaged in cyber threat information sharing using the database 200 as a storage facility that they write information to and read information from. In FIG. 2, some of the enterprises are using a Rough Set Sanitizer 100 and some are not. The Rough Set Sanitizer can be individualized to each enterprise or it can be an instantiated service provided by a trusted third party. In the illustration of FIG. 3, the case of individualized Rough Set Sanitizers is shown. Note that Enterprise 1 202 is associated with a Rough Set Sanitizer 210, Enterprise 2 204 is associated with a Rough Set Sanitizer 212, and Enterprise 3 206 is associated with a Rough Set Sanitizer 214; however, Enterprise m 208 is not associated with any Rough Set Sanitizer. The potential plurality of intervening enterprises between Enterprise 3 206 and Enterprise m 208 are depicted by the dots 216. These enterprises may or may not have a Rough Set Sanitizer associated with them as this depends on each enterprise's decision to either adopt the present invention or decline from doing so. Universal adoption of the present invention among the participants of cyber threat information sharing is not a prerequisite for an enterprise from deriving the present invention's benefits. The benefits stem from an enterprise's interaction with the Rough Set Sanitizer. In FIG. 2, there are communication channels associated with Enterprise 1 202, Enterprise 2 204, and Enterprise 3 206 that are depicted as unidirectional arrows, but these arrows indicate information flow and not channels that are necessarily physically distinct. Enterprise 1 202 passes the data that comprises the cyber threat information that it intends to share across a channel 218 that will not divulge Enterprise 1's 202 shared information (and potentially comprise the privacy still within the data). Similarly, Enterprise 2 204 passes the data that comprises the cyber threat information that it intends to share across a channel 220 that will not divulge Enterprise 2's 204 shared information. Likewise, Enterprise 3 206 passes the data that comprises the cyber threat information that it intends to share across a channel 222 that will not divulge Enterprise 3's 206 private information. In FIG. 2, Enterprise m 208 passes the data that comprises the cyber threat information that it intends to share directly to the database 200 across a channel 224. The Rough Set Sanitizer 210 reduces the likelihood that the presumed non-sensitive data from Enterprise 1 202 will have deductive paths to sensitive data. The Rough Set Sanitizer 212 reduces the likelihood that the presumed non-sensitive data from Enterprise 2 204 will have deductive paths to sensitive data. The Rough Set Sanitizer 214 reduces the likelihood that the presumed non-sensitive data from Enterprise 3 206 will have deductive paths to sensitive data. The Rough Set Sanitizer 210 then writes its data to the database 200 over a communications channel 226. Similarly, the Rough Set Sanitizer 212 then writes its data to the database 200 over a communications channel 228. Likewise, the Rough Set Sanitizer 214 then writes its data to the database 200 over a communications channel 230. Reads from the database 200 are straightforward: Enterprise 1 202, Enterprise 2 204, and Enterprise 3 206 perform reads of the database using their respective channels (232, 234, and 236) without enlisting the aid of a Rough Set Sanitizer, while Enterprise m uses the same bidirectional channel 224 as before. The present invention allows all the participating enterprises (202, 204, 206, 208, and 216) to enrich the database 200 and thereby individually benefit from it, but only those enterprises adopting the present invention are given the added assurance that sensitive data is not likely to be derived from the assumed non-sensitive data that they share.

The Rough Set Sanitizer 100 takes specific steps to transform the assumed non-sensitive data 102 to assure that sensitive data cannot be derived from the assumed non-sensitive data. (i.e., the "non-sensitive→sensitive" deductive paths are removed). The assumed non-sensitive data 102 can be considered as a table with columns labeled $a_1$ to $a_n$ and rows named $e_1$ to $e_m$. A column is usually designated as a concept or attribute or feature, whereas a row is called an example or instance. Set A designates the set of all the attributes and E the set of all the examples. To each example e corresponds a tuple $(v_1, v_2, \ldots, v_n)$, where $v_i$ is the value of attribute $a_i$ for the underlying example. It can also be the case where the value of the attribute $a_i$ for the example e is denoted by $a_i(e)$ i.e. $a_i(e)=v_i$. Let $V_a$ be the set of all values of the feature a. Each attribute a induces a function from E to $V_a$ which associates to an example its value for the feature a. Now set $V=\Pi_{i=1}^{n} V_{a_i}$ is the collection of n-tuples such that the ith entry is a possible value of the ith attribute. To each example of our table corresponds a unique element of V. Thus, we may define a function t that maps E to V as follows: $t(e)=(a_1(e), a_2(e), \ldots, a_n(e))$. The table is completely specified through the 4-tuple (E,A,V,t). Such a tuple is called an information system (IS). Customarily, when the IS is specified as a table, V and t are omitted so that the designation for an information system is IS (E, A).

Let B be a nonempty subset of attributes of an IS (E, A, V, t). We define a relation IB on E by IB=$\{(x,y) \in E_2 | a(x)=a(y)$ for all $a \in B\}$. The relation IB is an equivalence relation. Thus, the collection of distinct classes modulo IB, E/B, forms a partition of E. An equivalence class or block or granule of IB will be denoted $[x]_B$:$[x]_B=\{y \in E:(x,y) \in IB\}$. The equivalence relation IB is called a discernibility relation induced by the set of attributes B. It basically considers examples that have the same values for features in B as indistinguishable. The equivalence classes modulo IB are called elementary sets. A subset E that can be express as union of elementary sets is called a B-definable set.

Since it may happen that not all subsets of E are B-definable, the question arises to whether we can at least optimally bound them with definable sets. The answer to this question rests firmly with RST. Given a nonempty subset X of E, the largest B-definable set included in X is the set B*X={x∈E|[x]$_B$⊆X}, which is the B-lower approximation of X Likewise, the largest B-definable set containing X is the set B*X={x∈E|[x]$_B$∩X≠∅}, which is the B-upper approximation of X. It can be verified that B*X⊆X⊆B*X. The boundary of X with respect to B is the difference between its upper and lower approximations: ∂$_B$X=B*X−B*X. To measure the goodness of the approximation of X, the number $$\alpha B = \frac{|B_* X|}{|B^* X|}$$

may be used where |X| stands for the number of elements of X (i.e., its cardinality). If αB=1, then X is crisp with respect to B; otherwise, it is rough.

Now consider two sets of concepts C and D. We would like to compare the information granulations E/C={$X_1$, $X_2$, ..., $X_m$} and E/D={$Y_1$, $Y_2$, ..., $Y_n$}. A given block Y of E/D is the class of some examples based on the concepts of D. Now, if we decide to classify the elements of Y based on the features from C, there may be some inconsistency depending on how Y intersects the $X_j$'s. This is to say that Y will be in general rough with respect to C. Thus, the best approximation of Y based on C will be C*Y: the elements of Y can be assigned to blocks of E/D contained in Y without creating an inconsistency (i.e., an element assigned to distinct blocks). Thus, intuitively, the 'best approximation' of E/D given the concepts from C will be {C*$Y_1$, C*$Y_2$, ..., C*$Y_n$}. The set POS$_C$(D)=∪$_{i=1}^n$C*$Y_i$ is called the positive region of E/D with respect C. To quantify the degree of dependency of D on C, the present invention calculates the fraction $\gamma_C$(D) of elements of E which are uniquely assigned to blocks of E/D using concepts from $$C: \gamma_C(D) = \frac{|POS_C(D)|}{|E|}.$$

An information system DT=(E, C∪D, V, t), where the attributes are divided into condition features and decision concepts D, is called a decision table. Such tables assume a consequential dependency between C and D, where the premise is formulated in terms of concepts from C and the consequence depends on the decision features. Decision tables often arise in classification problems where one wishes to learn rules that allow one to assign to some example an appropriate value from V$_D$=Π$_{d∈D}$V$_d$. When one wishes to infer rules from a decision table, it is often desirable to get rid of condition attributes that do not affect the degree of dependency between C and D. Thus, one needs to know the contribution of each condition features in the dependency between C and D. A feature a∈C is dispensable if $\gamma_C$(D)=$\gamma_{C−\{a\}}$(D). A reduct R of DT is a subset of C such that $\gamma_R$(D)=$\gamma_C$(D) and for all a∈R, $\gamma_{R−\{a\}}$(D)≤$\gamma_C$(D). Finding all the reducts of a decision table is an NP-hard problem. For classification it is often desirable to obtain the reduct with the least number of elements. For those skilled in the art, there are several fast heuristic algorithms for obtaining a reduct. For illustration, assume that the set of reducts of DT is S={$R_1$,$R_2$, ..., $R_p$}. The core of DT, CORE(DT) is the intersection of all its reducts i.e. CORE(DT)=∩$_{i=1}^P$R$_i$. The computation of the core of a decision table involves multiple evaluations of the dependency degrees. Thus, this computation must be done efficiently.

Referring to FIG. 3, the present invention provides a flowchart detailing the steps the Rough Set Sanitizer takes to produce data 104 sanitized of deductive paths from non-sensitive data to sensitive data. For the purpose of sanitization of the data so as to reduce the likelihood of "non-sensitive→sensitive" from occurring, it becomes more convenient to designate an information system with the form (E, NS∪S), where NS is the set of non-sensitive attributes and S is the set of sensitive attributes (that is, A=NS∪S). The sensitive features are those that must be concealed through some algorithms and must be done so such that they are not reasonably approximated from the knowledge of some non-sensitive concepts. This is quite a challenge since the benign features sometimes contain concepts on which sensitive attributes inferentially depend. These are the so-called quasi-identifiers (QIDs). These QIDs must also be appropriately masked to cut the deductive route to any potential leak. Most mediatized linking attacks have happened through QIDs overlooked by the data sanitizer or poorly redacted information.

All inferential leaks happen through classification with respect to QIDs or sensitive features. The present invention increases classification errors with respect to these features. This is done by foliating the information systems into decision tables such that the set QIDs become the union of cores of these information systems. According to RST, by coarsening the granularity of E/QIDs or E/S (these are blocks of the discernibility relations with respect to QIDs and sensitive attributes respectively), the present invention lowers the dependency of S on NS, thereby cutting the deductive route from NS to S. Precisely, consider the following family of decision tables DT$_i$=(E, D$_i$∪C$_i$), where C$_i$=NS∪{$s_1$,$s_2$, ..., $s_{i−1}$,$s_{i+1}$, ..., $s_{|S|}$} is the set of condition concepts and D$_i$={$s_i$} is the decision feature with S={$s_i$:i=1:|S|} and i ranges from 1 to |S|. The foliation is done this way to capture the dependency between NS and S and the possible correlation amongst the $s_i$'s. In doing this, the present invention is anticipating cascade inferential breaches.

The above construction is key in the present invention, so for the purpose of illustration, assume that S={$s_1$,$s_2$}. Now consider two sets of concepts C and D. Then, DT$_1$=(E, D$_1$∪C$_1$) and DT$_2$=(E, D$_2$∪C$_2$), where D$_1$=NS∪{$s_2$}, C$_1$={$s_1$}, D$_2$=NS∪{$s_1$}, and C$_2$={$s_2$}. It is trivial that when S={s}, the information system is already foliated. QIDs form a minimal set of non-sensitive features which can be joined with other attributes to make inferences about sensitive concepts with high enough probability. According to this definition, QIDs are the collection of the cores of the decision tables DT$_i$, i=1:|S|, that were defined above save the elements of S. This is to say, QIDs=∪$_{i=1}^{|s|}$CORE(DTi)−S. This formula is the basis for step 302 in the process of FIG. 3. The previous explanation of E/QIDs is the basis for step 304 in the process of FIG. 3.

According to the above rigorous mathematical definition of QIDs, to undermine potential attackers' inferential power, any sanitization scheme must aim at reducing the positive region of S given QIDs. Intuitively, this is done by reducing the ranges of QIDs or sensitive features to engender inconsistencies. That is, coarsening E/QIDs (as carried out in step 304 in the process of FIG. 3) or E/S. Whichever strategy is chosen is a function of both analysis and privacy policies. The present invention iteratively realizes range compression by merging blocks of E/QIDs or those of E/S and using them as classification classes of the redacted QIDs or sensitive features.

The present invention embodies the process of FIG. 3 that achieves a balance between the homogeneity of QIDs and the diversity of sensitive attributes to create a Rough Set Sanitizer 100 output that reduces the likelihood of the existence of inferential paths from the assumed non-sensitive data to sensitive data. Let Y be a block of E/QIDs; the distribution of S-values in Y is well approximated by the S-upper approximation of Y (i.e., S*Y). Thus, we shall call the cardinality of |S*Y| the rough diversity of Y. If we merged two blocks, $Y_1$ and $Y_2$, the rough diversity of the resulting set will increase by at most $|S^*Y_1 \cap S^*Y_2|$. Indeed, $S^*(Y_1 \cup Y_2) = S^*Y_1 \cup S^*Y_2$. This yields the following equality: $|S^*(Y_1 \cup Y_2)| = |S^*Y_1| + |S^*Y_2| - |S^*Y_1 \cap S^*Y_2|$, which shows that the change in diversity when we merge the two blocks is at most $|S^*Y_1 \cap S^*Y_2|$. Therefore, the larger the latter quantity, the more diverse the combined block. Armed with the previous insight, the present invention defines the semantic similarity measure between the blocks $Y_1$ and $Y_2$ through the Jaccard distance as follows:

$$d(Y_1, Y_2) = 1 - \frac{|S^*Y_1 \cap S^*Y_2|}{|S^*Y_1 \cup S^*Y_2|} = Jacc(S^*Y_1, S^*Y_2)$$

It can be verified that d in the above formula satisfies all the properties of a pseudo-metric (non-negativity and triangle inequality). However, d restricted to the range of S* is a distance. It is important to stress that Jacc can be replaced with any semantic measure in the above definition of d. Also, for the sake of increasing diversity with respect to sensitive values, the present invention merges blocks of E/QIDs that are dissimilar with respect to d. Step 306 of in the process of FIG. 3 uses the above formula to compute d and then maximizes the resultant value of d to yield Θ. In order to to achieve optimal diversity while preventing skewness of the distribution of sensitive values, the present invention introduces the notion of rough closeness: A block X of E/QIDs is roughly t-close, t≥0, to other blocks if max ({d(X,Y): Y∈E/QIDs})≤t. The granulation E/QIDs is roughly t-close if all its blocks are so.

Armed with the value Θ, the process of FIG. 3 enters a loop 310-320 whose branching condition 310 tests the value of Θ against the value of t. If the result of this test indicates that Θ is greater than t, then the process continues to step 312. In step 312, the set Q is formed by those ordered pairs (i, j) such that $d(Y_i, Y_j) = \Theta$. From step 312, the process proceeds to step 314 for the selection of an ordered pair of integers (a, b) using the arguments of the minima. In mathematics, the arguments of the minima (abbreviated arg min) are the points of the domain of some function at which the function values are minimized. The points in this case are the set of integers arising from the sums of the cardinalities of the sets $Y_i$ and $Y_j$, selected by the criterion that the ordered pairs (i,j) are elements of the set Q. From step 314, the process proceeds to step 316 for the formation of a set difference. This set difference, I, is formed by taking the set of positive integers from 1 up to and including the cardinality of the partition ℙ (ℙ was found in step 304) and removing from this set the integer elements a and b found in step 314. From step 316, process proceeds to step 318 where ℙ is modified. ℙ now becomes a set formed by the union of three sets: $Y_a$, $Y_b$ and the set of $Y_k$ such that k is an element of the set I that was formed in step 316 of the algorithm. From step 318, the process proceeds to step 320 where ℙ is used for a selection of subscripts i and j of $Y_i, Y_j$ to form a set of $d(Y_i, Y_j)$ values. Step 320 takes the maximum of this set to modify the value of Θ. The process then returns to test step 310, which determines if the modified value of Θ remains greater than t. If Θ has a value greater than t, then the process re-enters the loop by proceeding to step 312; otherwise, the process exits the loop and goes to step 322. In step 322, the process will output the sanitized data in the form of the partition ℙ of E that was modified in step 318 of the processes loop. The granulation ℙ of the present invention's process is employed for anonymity by assigning the same QIDs values to members of each granule. The elements of the modified partition ℙ possess the optimal diversity while preventing skewness of the distribution of its sensitive values. This optimality is measured by the granulation ℙ in terms of t-close, t≥0.

Clearly many modifications and variations of the present invention are possible in light of the above teachings. It should therefore be understood that, within the scope of the inventive concept, the invention may be practiced otherwise than as specifically claimed.

What is claimed is:

1. In a configuration of a plurality of computer network enterprises accessing a database processor over computer network communications channels, a system for ensuring privacy against cyber threats, comprising:
 a rough set sanitizer processor corresponding to at least one of said plurality of computer network enterprises;
 wherein said rough set sanitizer processor
   determines the number of quasi-identifiers in said data based on predetermined sensitive attributes;
   creates a like number of decisions tables comprising said data corresponding to a like number of said sensitive attributes;
   conflates non-sensitive attributes and said sensitive attributes in said decision tables; and
   identifies a decision attribute for omission from said decision tables so as to increase the diversity of said sensitive attributes among said data;
 a first computer network communications channel between said computer network enterprise and said rough set sanitizer processor over which data is transmitted in tabular form;
 a second computer network communications channel between said rough set sanitizer processor and said database processor over which data that said rough set sanitizer has removed deductive paths to sensitive data from, is transmitted; and
 a third computer network communications channel between said database processor and said computer network enterprise over which database data having deductive paths to sensitive data removed, is transmitted in the same format as the initial input data.

2. The system of claim 1, wherein said rough set sanitizer processor receives a dataset together with its sensitive attributes;
 determines quasi-identifiers of said sensitive attributes;
 coarsens equivalence classes of said quasi-identifiers so as increase the diversity of related sensitive attributes,
   wherein said coarsening further comprises merging dissimilar equivalence classes of quasi-identifiers; and
 computes an optimal degree of diversity among said sensitive attributes that results in a minimal skewedness in the distribution of said sensitive attributes.

3. The system of claim 2, wherein said rough set sanitizer processor determines whether said sensitive attributes possess a degree of diversity greater than a predetermined value;
- forming a first partition of said diversified sensitive attributes to achieve an appropriate degree of diversity;
- forming a second partition from said first partition according to a predetermined criteria; and
- outputting sanitized data having optimized diversity and minimized skewedness of sensitive attributes when the degree of diversity is less than a predetermined value.

4. The system of claim 3, wherein said data is arranged in tabular form having data pairs, with each data pair having a data item and an associated data attribute.

5. The system of claim 4, wherein said quasi-identifiers comprise two or more attributes that provide deductive paths to sensitive data.

6. The system of claim 5 where equivalence classes comprise quasi-identifiers having the same weight.

7. In a configuration of a plurality of computer network enterprises accessing a database processor over computer network communications channels, a computer implemented method for ensuring privacy against cyber threats, comprising the steps of:
- rough set sanitizing at least one of said plurality of computer network enterprises;
- wherein said step of rough set sanitizing further comprises the steps of determining the number of quasi-identifiers in said data based on predetermined sensitive attributes;
  - creating a like number of decisions tables comprising said data corresponding to a like number of said sensitive attributes;
  - conflating non-sensitive attributes and said sensitive attributes in said decision tables; and
  - identifying a decision attribute for omission from said decision tables so as to increase the diversity of said sensitive attributes among said data;
- transmitting initial data in tabular form over a first computer network communications channel between a computer network enterprise and a rough set sanitizer processor over which data is transmitted in tabular form;
- removing deductive paths to sensitive data in said rough set sanitizer and transmitting said data with deductive paths removed over a second computer network communications channel between said rough set sanitizer processor and said database processor; and
- transmitting in the same format as said initial data, said data with deductive paths removed, over a third computer network communications channel between said database processor and said computer network enterprise.

8. The computer implemented method of claim 7, further causing said rough set sanitizer processor to
- receive a dataset together with its sensitive attributes;
- determine quasi-identifiers of said sensitive attributes;
- coarsen equivalence classes of said quasi-identifiers so as increase the diversity of related sensitive attributes,
  - wherein said coarsening further comprises merging dissimilar equivalence classes of quasi-identifiers; and
- compute an optimal degree of diversity among said sensitive attributes that results in a minimal skewedness in the distribution of said sensitive attributes.

9. The computer implemented method of claim 8, further causing said rough set sanitizer processor to
- determine whether said sensitive attributes possess a degree of diversity greater than a predetermined value;
- form a first partition of said diversified sensitive attributes to achieve an appropriate degree of diversity;
- form a second partition from said first partition according to a predetermined criteria; and
- output sanitized data having optimized diversity and minimized skewedness of sensitive attributes when the degree of diversity is less than a predetermined value.

10. The computer implemented method of claim 9 further comprising the step of arranging data in tabular form having data pairs, with each data pair having a data item and an associated data attribute.

11. The computer implemented method of claim 10 wherein said quasi-identifiers comprise two or more attributes that provide deductive paths to sensitive data.

12. The computer implemented method of claim 11 where equivalence classes comprise quasi-identifiers having the same weight.

* * * * *